Oct. 8, 1946.  W. J. MILLER  2,409,172
APPARATUS FOR THE MANUFACTURE OF POTTERYWARE
Filed Oct. 6, 1941  3 Sheets-Sheet 1
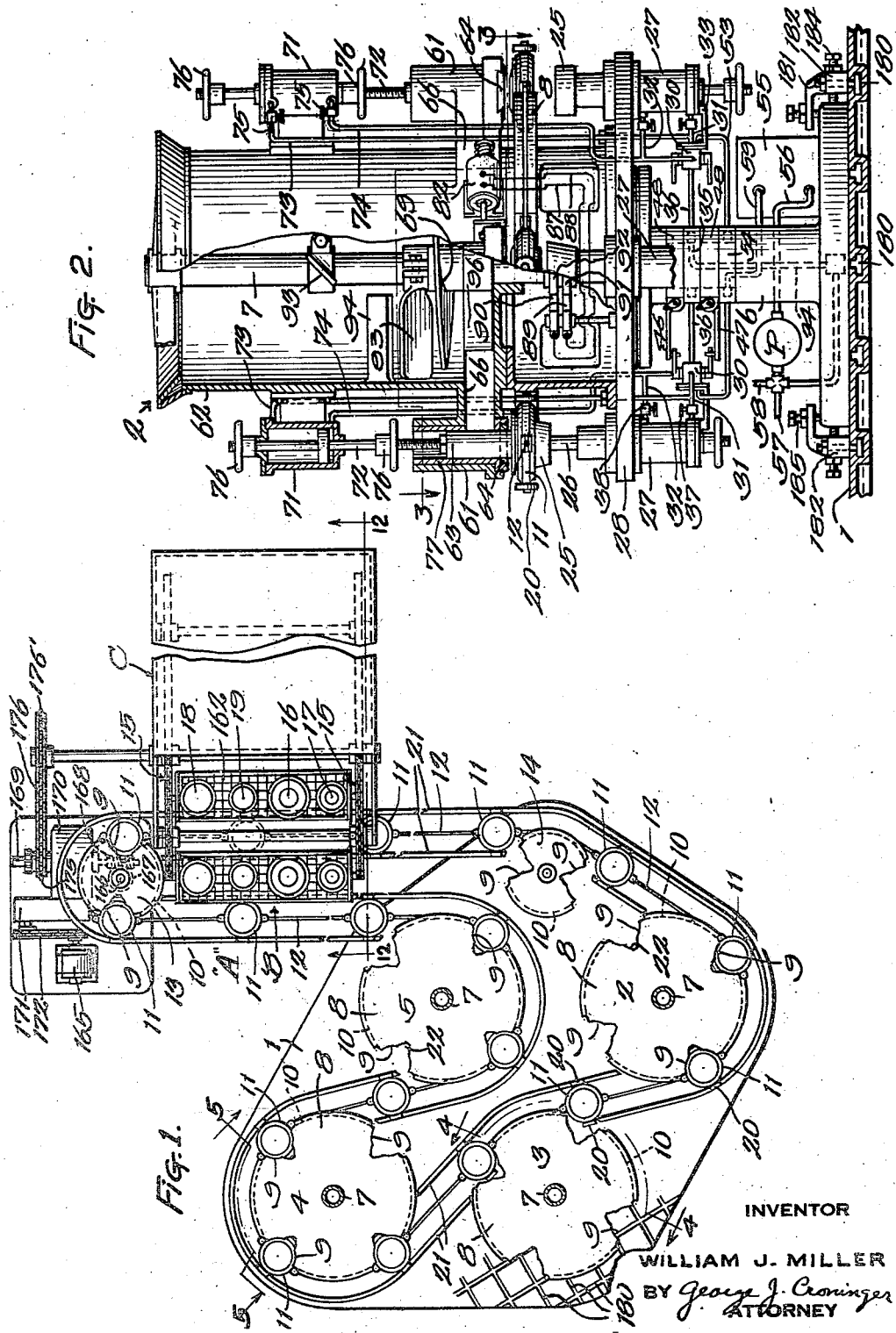
INVENTOR
WILLIAM J. MILLER
BY George J. Croninger
ATTORNEY Oct. 8, 1946. W. J. MILLER 2,409,172
APPARATUS FOR THE MANUFACTURE OF POTTERYWARE
Filed Oct. 6, 1941 3 Sheets-Sheet 2
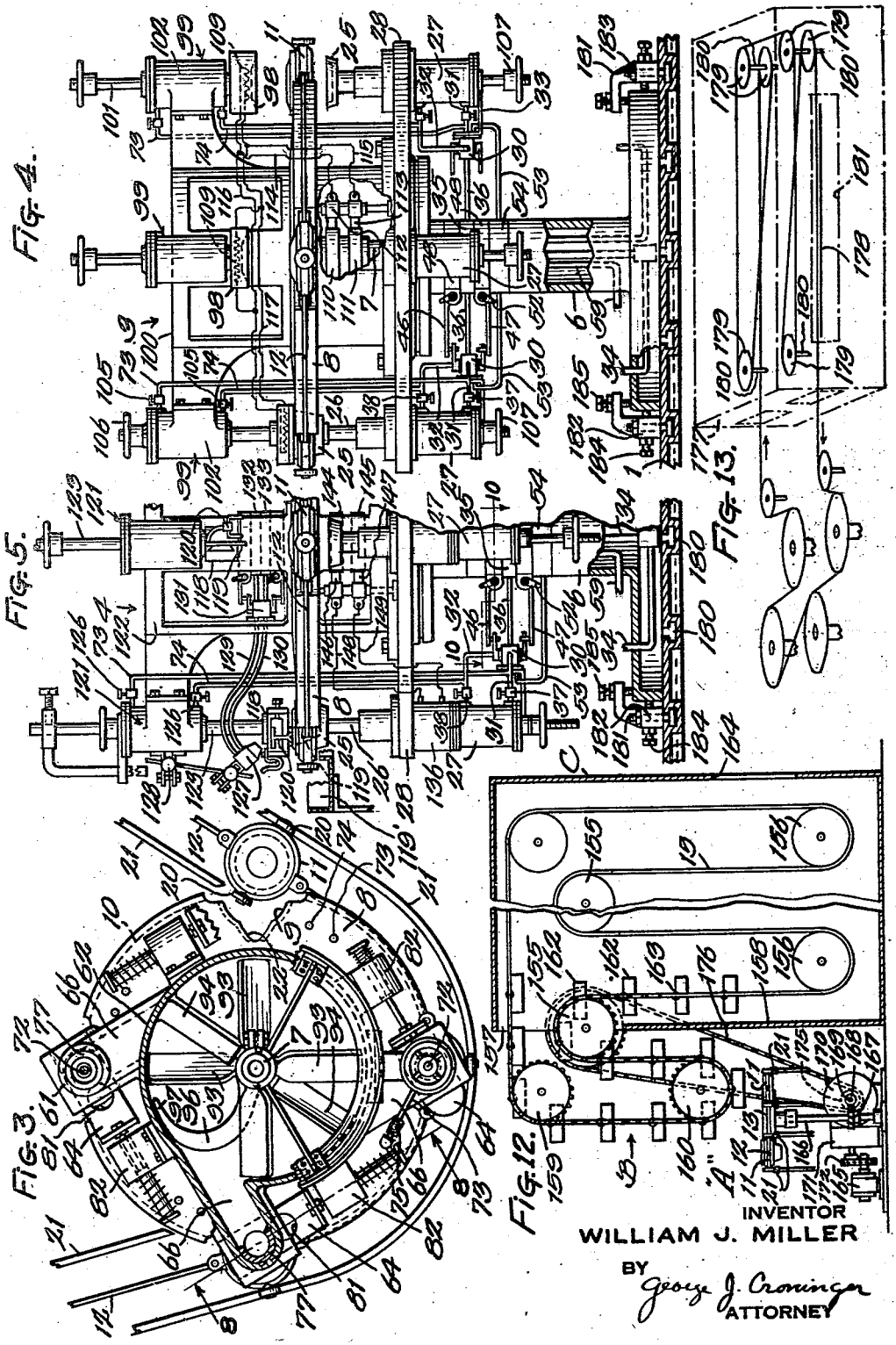
INVENTOR
WILLIAM J. MILLER
BY
George J. Croninger
ATTORNEY

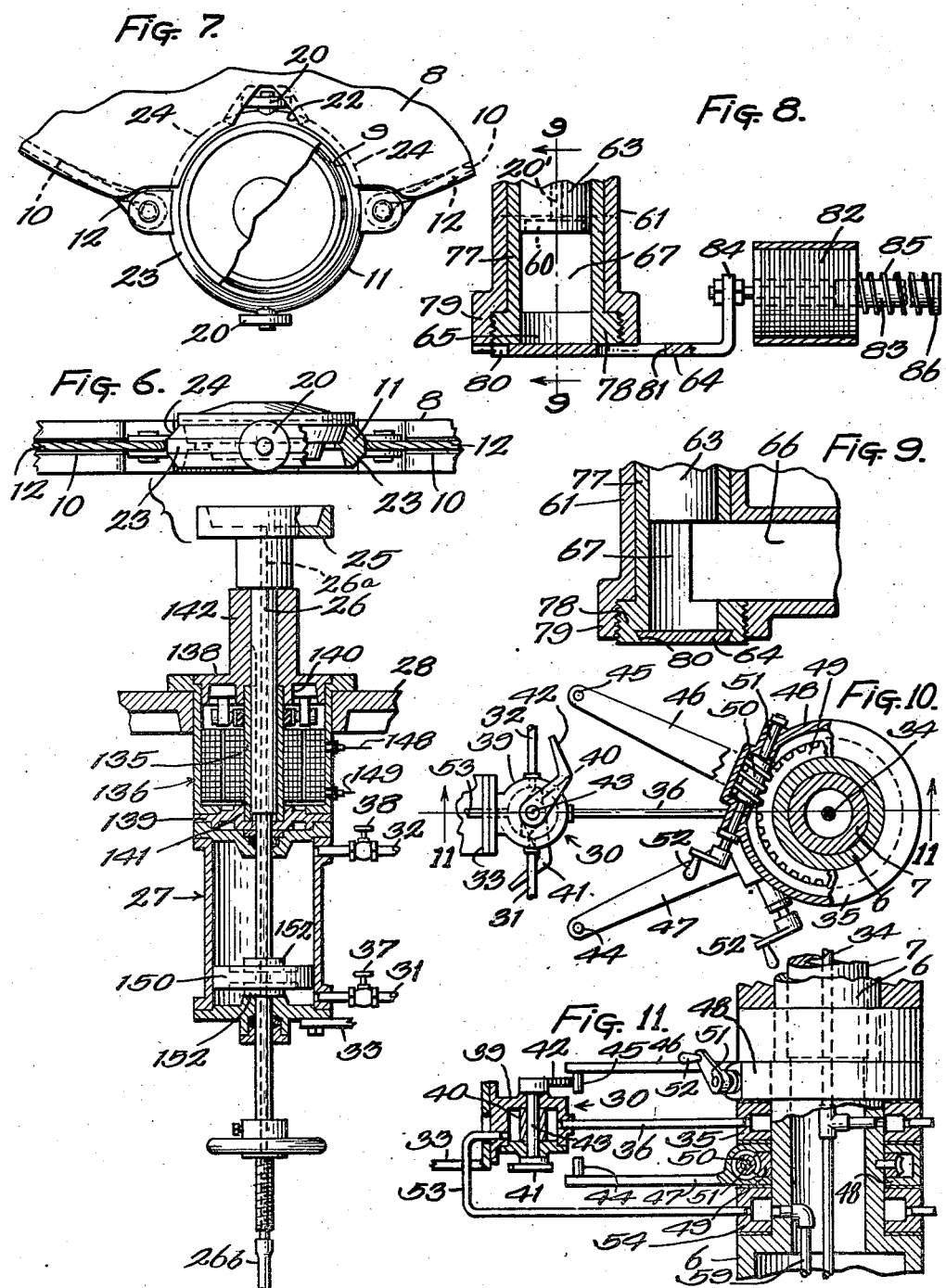

Patented Oct. 8, 1946

2,409,172

UNITED STATES PATENT OFFICE 2,409,172

APPARATUS FOR THE MANUFACTURE OF POTTERYWARE

William J. Miller, Swissvale, Pa., assignor to Miller Pottery Engineering Company, Swissvale, Pa., a corporation of Pennsylvania Application October 6, 1941, Serial No. 413,734

35 Claims. (Cl. 25—22)

This invention relates to methods and apparatus for manufacturing potteryware. It has to do with the production of jiggered ware, such as plates, cups and saucers and the like, from plastic clay on absorbent molds.

According to the present invention, the molds are moved in single file along a predetermined path and at locations spaced along said path, clay is fed to the molds and formed therein, all whilst the molds are in continuous motion. The ware is thereafter dried and the molds returned for refilling.

One object of this invention is to provide a system and apparatus wherein productive operation is on a continuous and not intermittent scale, and to increase production capacity and speeds.

Another object is to provide for a wide range of production diversification whereby, due to this feature or the high speed feature, or both, the system will be highly adaptable to the high form diversity requirements of small potteries and the low form diversity high speed requirements of large potteries making a more standardized production.

Another object is to produce ware of excellent quality and appearance with a very low percentage of rejects or loss and in this connection, I have provided for ample periods of time to perform necessary operations properly and according to best practice.

Another object is to produce ware free from tool strains in the clay state and in this regard, I provide for an additional profiling step, by means of which these strains are relieved.

Another object is to eliminate the need for skilled craftsman and to reduce manual intervention to a minimum. A further object is to simplify apparatus and procedure and reduce factory space requirements.

I propose to accomplish these and other objectives by providing a series of rotatable table type machines, similar in some respects to that shown in Patent 2,293,070, each equipped with apparatus for performing a specified operation, for instance, feeding, preforming and profiling and to operate these tables in timed relation with a continuous motion mold conveyor operatively associated therewith and adapted to convey molds in succession to the various machines and either into adjacency to or through a dryer where the ware is dried, the molds being returned for refilling when empty.

In the drawings:

Fig. 1 is a diagrammatic illustration of the machine as seen in plan.

Fig. 2 is a view partly in elevation and partly in section of the clay charging organization of the machine.

Fig. 3 is a sectional plan view of the clay charging organization as taken substantially on the section line 3—3 of Fig. 2.

Fig. 4 is a side elevation of the clay performing organization of the machine, with certain parts broken away and seen in section, and as viewed from the section line 4—4 of Fig. 1.

Fig. 5 is a fragmentary elevation of the initial jiggering organization of the machine, as viewed from the section line 5—5 of Fig. 1.

Fig. 6 is an enlarged sectional detail of certain parts as seen in Fig. 5.

Fig. 7 is a plan view of parts seen in Fig. 6.

Fig. 8 is an enlarged detail section taken on the section line 8—8 of Fig. 3.

Fig. 9 is a detail section taken on the section line 9—9 of Fig. 8.

Fig. 10 is an enlarged detail plan section taken on the section line 10—10 of Fig. 5.

Fig. 11 is a sectional view taken on the section line 11—11 of Fig. 10.

Fig. 12 is a diagrammatic vertical section taken on the section line 12—12 of Fig. 1, illustrating the drying apparatus associated with the machine.

Fig. 13 is a diagrammatic view illustrating how the machine mold conveyor may be arranged to travel through a dryer.

As diagrammatically seen in Fig. 1, the machinery has a base 1, upon which are mounted the machines for performing the various operations. Said machines include a mold charging machine 2, a preforming machine 3 and a jiggering machine 4 and if desired, an additional jiggering machine 5 for purposes to be later described. Each machine has a stationary pedestal 6, a hollow center shaft 7 and a rotatable table 8, Figs. 2 and 3, having semi-circular peripheral sockets 9 and a peripheral groove 10 for receiving and supporting the mold supporting rings 11 and inter-connecting cable sections 12, which together, form an endless conveyor for the transportation of molds.

The conveyor which moves continuously is arranged in a horizontal plane and is also looped around a sprocket-like drive member 13 and an idler 14 each provided with sockets 9 and peripheral cable grooves 10.

In regard to the location and arrangement of these machines, it has been stated hereinbefore that ample time is to be provided for properly performing the various operations mentioned.

The optimum time interval for each operation will be that which in practice is indicated to be correct for each operation. Once these requirements are determined, the other factors, such as the amount of conveyor in association with each table, the diameter of the table, the speed of rotation thereof and the speed of travel of the conveyor can be determined.

For illustrative purposes, it will be assumed herein that the jiggering operation requires the longest interval of time to complete, as it normally does. The pressing or preforming operation takes the least time and the feeding operation requires about the same length of time as preforming. Thus, the machines are so arranged that for feeding, the conveyor is associated with the table of machine 2 for about 90° and for pressing or preforming the conveyor is associated with the table of machine 3 for about 45°. Jiggering, which takes the longest interval, may be carried out on one or more machines. The conveyor is shown as being in association with the table of machine 4 for approximately 180° which may provide ample time for the tool depending on the type and size of ware and the clay. If this interval is not long enough then the operation may be completed on machine 5 which is shown with the table and conveyor in association for about 180°.

If desired, machine 5 may be used to produce a finished surface on the ware leaving the matter of rough cutting to machine 4. Where it is used for finishing, I prefer to take a very light finishing cut to trowel and highly polish the ware surface. Machine 5 may also be used to normalize the plastic clay which develops strains whilst being profiled.

Obviously any desired number of machines may comprise the group depending on the number and nature of the operations to be performed and the practicability of sub-dividing operations.

The mold loading and unloading station A, see Figs. 1 and 2, is located in close proximity to a downward course B of the dryer conveyor 15. The molds are shown in these views as being manually transferred between the dryer conveyor and machine conveyor.

The organized machinery is capable of making round jiggered pottery dinner ware, such as plates, cups and saucers and the like. Production may be diversified, if desired, and various types and forms of ware made in succession as illustrated by molds 16, 17, 18 and 19, representing both hollow ware and flat ware types. The maximum range of product diversification at any one time is herein illustrated, for example, as four and the molds therefore are arranged on the conveyor in sets of four, the molds of each set in the entire conveyor circuit corresponding to all other sets as to position, type, capacity, etc. A sample production set-up would be (1) a dinner plate, (2) cup, (3) saucer and (4) bowl and all the machinery would be adapted throughout to accommodate this production which would involve proper tools, chucks, mold seats, operational adjustment, etc. Changes in the production set-up may be made whenever desired, the amount and extent of machine re-adjustment and replacement of tools, chucks and other parts depending on the size of the molds and the type of ware involved.

With reference to the mold conveyor, the mold supports 11 have two rollers 20 adapted to ride upon track sections 21 and to be received freely within vertical notches 22, Fig. 7, of table 8 when the supports are associated with the sockets 9. The supports are held firmly level in vertical location in the sockets by the outwardly tapered peripheral tongue 23 within correlatively formed groove portions 24 in the side walls of sockets 9, Fig. 6, and when in such association, the mold registers with a mold lifter or chuck 25 therebelow and feeding or fabricating equipment thereabove, depending on the machine. The mold lifters and the feeding or fabricating apparatus are herein shown as actuated by fluid motors, all substantially similar in construction and operation.

The mold chucks 25 are mounted on the top ends of vertical pistons 26 of piston and cylinder type fluid pressure-operated motors 27 secured to the rotatable tables 28 of the machines. Each piston rod preferably has a vacuum conduit 26a, connected to a vacuum hose 26b for intermittently vacuumizing the mold chucks 25 of the machines. Generally, the motors 27 are operated to raise and lower the molds in timed relation with the movement of the conveyor, by the motors 27 being alternately connected with a suitable source of fluid under pressure, by way of an automatically operated four-way control valve 30, Fig. 11, cooperating between conduits 31 and 32, leading from the ends of the cylinder and a supply conduit system leading to said source. The valves 30 are supported by brackets 33 on the cylinder housings.

The piping system of each machine includes a central stationary conduit 34 inside the pedestal, leading from a pump P to an interiorly grooved hollow ring-like distributor head 35 rotatable on the pedestal and connected to the valves 30, through pipes 36. Pipes 31 and 32 to the motors 27 have manually operated control valves 37 and 38 respectively to control the rate of flow of fluid to the motors 27 in regulating the speed of movement of the mold chucks to raised and lowered positions.

The valves 30 and the means for automatically operating same are described in Patent 2,293,070. As shown in Figs. 10 and 11, the valves 30 are of the oscillating four-way type, each having an upright cylindrical valve-casing 39 through which the conduits 31 and 32 are alternately connected to conduit 36 by an oscillating plug type valve member 40 which is oscillated by two cam levers 41 and 42 on the shaft 43, which during rotation of the table 28 are successively engaged by cam pins 44 and 45 on the ends, respectively of stationary cam arms 47 and 46 adjustably mounted on the pedestal 6 of each machine. Each arm has at its inner end, an internally grooved hub 48 within which is disposed a ring gear 49 secured on the pedestal and meshing with a worm 50 on a shaft 51 mounted in bearings of the hub. A hand-crank 52 on the shaft 51 is for rotating the worm to adjust the arms about the axis of the pedestal. The hubs 48 of the arms are arranged on opposite sides of the distributor-ring 35 to support same in vertical position on the pedestal.

Each valve 30 has a vent pipe 53, leading to a distributor 54 similar to distributor 35 and the outlet side of this distributor is connected by pipe 59 to a tank 55 from which an intake line 56 leads to the pump P. The pump P and tank 55 may be common to all machines and connected by pipes 57 and 58 to the preformer and jigger.

In that the molds for producing the various articles only vary as to the shape and depth of the molding surfaces thereof, and are well-known in the art, it is considered sufficient to mention that the mold chucks for cooperating with same vary in depth of cavity and range of reciprocation accordingly in raising same out of the carriers.

Referring to Figs. 2, 3, 8 and 9, the mold charging machine 2 has four charger units arranged respectively above the sockets 9 and designed to place measured preformed clay charges onto the center of the molding surface of the molds, as they are raised into cooperative relation therewith. To this end, each charging unit includes an upright charging cylinder 61 mounted on the container 62 and arranged in co-axial alignment with a mold chuck, and within which reciprocates a charging plunger 63, which, when in raised position, cooperates with a sliding gate 64 at the discharging end 65 of the cylinder to form a clay-charge-measuring chamber 67. Clay is fed into the measuring chambers of the units by way of passages or ducts 66 connecting the chamber with the interior of container 62 which together with auger 69 forms an upright clay extrusion device. The container is supported by table 8 and is rotatable therewith whilst the auger 69 is mounted on shaft 7 and is stationary.

When a mold is raised into cooperative relation with a charging unit, the gate 64 of said unit is opened and the plunger 63 thereof is lowered to eject the charge of clay from the chamber 67 and forcefully place and stick the same to the center of the molding surface of the mold, whereupon, air under pressure is blown through conduit 20 and the porous head 69 of the plunger to release the charge therefrom. Then the piston is raised and the gate closed, preparatory to the next operation as the mold is lowered onto its carrier.

Each plunger is reciprocated by a cylinder-and-piston type fluid pressure operated motor 71 mounted on the container 62 and having a depending piston-rod 72 on whose bottom end the plunger is secured. The upper and lower ends of the cylinders of the motors 71 are inter-connected, respectively, with the lower and upper ends of the cylinders of their respective chuck motors therebelow by way of conduits 73 and 74 branching from the conduits 31 and 32 of the chuck motors whereby the plunger and chuck motors will operate in unison. In each of the conduits 73 and 74 is a valve 75 to control the flow of fluid to the plunger motors in regulating the rate of movement of the plungers.

To regulate the uppermost position of the plunger 63 in finally determining the size, weight or volume of the clay charge to be fed thereby, the piston rods 72 thereof may extend through bearings in the end-walls of the motor cylinders with adjustable hand nuts 76 threaded on the pistons for engaging said end-walls to limit movement of the piston. To regulate the lowermost position of the plunger and its nearest approach to the molding surface and thus determine the thickness of clay therebetween the top nut is accordingly adjusted. To enable materially increasing or decreasing the capacity of the measuring chambers of the charger units, each cylinder 61 thereof is provided with an inner detachable cylinder portion or liner 77 having an enlarged exteriorly threaded lower end 78 threaded into the enlarged lower end 79 of the cylinder, whereby it may be removed therefrom and another liner of a smaller or larger inner diameter may be substituted therefor to change the capacity of the chambers. Accordingly, the plungers 63 are threaded onto the piston rods 72 so that various sizes of plungers may be attached thereto in accordance with the sizes of the inner cylinder liners 77.

The gate 64 for each charger unit is in the form of an elongated slide-plate guided for reciprocation within a guideway 80 formed across the bottom-end of the cylinder liner 77 of the unit and is provided with an opening 81 which registers with the discharge end of the charger cylinder thereof at one limit of movement of the slide. Although, the gates may be operated by any suitable means, each is reciprocated by an electric solenoid 82 mounted on the side wall of the pug mill with the sliding core 83 of the solenoid being connected with an upturned end 84 of the gate. A coiled compression spring 85 is arranged on the core 83 between the enlarged end 86 thereof and an endwall of the solenoid to urge the gate in the closing direction. The solenoids are energized to open the gates 64 when the charger plungers are about to function, by their terminals being connected through conductors 87 and 88 (see Fig. 2) with contacts 89 and 90 which, during a portion of each revolution of the turret, engage adjustable, stationary, segmental, arcuate contacts 91 and 92 connected with any suitable electric power lines.

Ducts 66 leading to the charger units, Fig. 3, extend laterally from the bottom thereof at an angle opposite the direction of rotation thereof to expedite the flow of clay from the hopper into the measuring chambers by way of the ducts during rotation of the hopper. Clay mascerating knives 93 on shaft 7 cooperate with knives 94 mounted on the inner wall of the hopper to thoroughly cut up clay filter cakes fed into the hopper through the open top end thereof as the hopper rotates. After the cut up clay passes the knives, it is forced into the ducts 66 and into the measuring chambers of the charger units as the hopper rotates, by the auger 69 on the shaft 7 cooperating with an arcuate clay deflector arm 96 arranged therebelow and mounted on said shaft. Said arm has the end 97 thereof formed as the segment of a circle and of sufficient length to seal the entrance end of the ducts 66 when in full cooperation therewith. This prevents back flow of clay whilst the charge is being ejected.

With regard to the performing machine 3, Fig. 4, to which the molds are transported after leaving the charging device, 98 are clay pressing dies arranged above the sockets 9 of table 8 of this machine in coaxial alignment with the chucks 25 therebelow, the dies being mounted for vertical reciprocation to cooperate with the molds supported by the chucks in pressing or preforming the clay charges thereon into the desired shapes. The dies are reciprocated, respectively, by fluid pressure operated cylinder and piston type motors 99 arranged thereabove and mounted on the sides of a cylindrical bracket 100 arranged centrally on the table 8, each motor having a depending piston rod 101 at the lower end of which its respective, suitably shaped die is secured. Each die motor 99 is operated to lower its die 98, upon the raising of a mold by the chuck therebelow, into cooperative relation therewith. The piston chamber of motor 99 is connected to pipes 73 and 74 to establish control thereof by valve 30. In each of said conduits 73 and 74 is a throttle valve 105 to control the flow of the fluid into the die motors in regulating the speed of movement of the dies relative to the chucks. The thickness to which the charge is compressed may be regulated, whilst in operation, if the table is rotating slow enough, by nuts 106 and 107. As the dies function more efficiently when heated, each is provided with an electric heating element 109 within the hollow interior thereof. During rotation of the dies with the table 8, the heating coils thereof are maintained in connection with suitable electric power lines by way of contact rings 110 and 111 on the central shaft 7 of the machine. These rings cooperate with contacts 112 and 113 supported on the turret and from which lead conductors 114 and 115 connected with the terminals of the heating coils through branch conductors 116 and 117.

The ware forming surface of the dies will be reversely contoured with respect to the wareforming surface of the molds with which they cooperate. The range of reciprocation of the dies may therefore vary in accordance with the depth of the molding surface of the molds, with the fluid motors being arranged to function accordingly.

With regard to the jiggering machine 4, to which the molds are conveyed successively after leaving the preforming machine 3, said machine has four jiggering units arranged respectively, above the sockets 9 thereof, with each unit including a vertically reciprocable tool holder 118 which is lowered when the mold chuck 25 therebelow raises a mold to bring the preformed work in or on the mold into cooperative engagement with the profile tool 119 slidably clamped in the holder. A trimmer 129 is fastened to the holder bracket. Scrap clay produced in profiling and trimming is thrown into stationary trough 119' encompassing a portion of the perimeter of the table 8.

Each profile is reciprocated by a fluid pressure operated cylinder and piston type motor 121 arranged thereabove and mounted on the side of a central upright cylindrical bracket 122 supported on table 8. The motor has a depending piston rod 123 at the bottom end of which the holder 118 is detachably secured. Motors 121 actuate the profile tools in timed relation with the movement of the mold chucks 25 by virtue of conduits 73 and 74 and valve 30. In each of the conduits 73 and 74 is a valve 126 to control the flow of fluid to the motors 121 in regulating the rate of action of the jiggering heads.

During the operation of each profile, the surface of the work is lubricated by means of a fine spray of water being directed thereon from a spray gun 127 arranged adjacent the profile and adjustably mounted on the housing of motor 121 by bracket 128.

Water and air, under pressure, are supplied to the spray gun from suitable sources by way of conduits 129 and 130 leading from the gun into ring-like water and air distributor heads 132 and 133 respectively, rotatably mounted on the central shaft 7 of the machine, and which are similar to the distributor head 35. For adjustably regulating the instant of application and length of application of spray from each gun, an automatically operated two line shut-off valve 131 is interposed in the conduits 129 and 130. With the exception of being of the two line shut off type, the valves 131 and means for operating same are substantially similar to the valves 30 and means for operating them associated with the chuck motors.

In case it is desired to rotate the chucks of the machinery, the piston rod 26 upon which each chuck is mounted may extend through in sliding key connection with the hollow shaft 135 of an electric motor 136 interposed between the chuck and the fluid pressure motor 137 thereof. The motors 136, Fig. 6, are suspended below table 28 with the fluid pressure motors secured onto their bottom ends, as seen in Fig. 6. Each electric motor 136 has top and bottom end walls 138 and 139 in which are bearings 140 and 141 supporting the ends of the motor shaft with the upper bearing continuing upward into a bearing portion 142 within which the piston 143 is supported.

The electric motors 136 are energized to rotate the chucks when raised, by each motor being connected with any suitable electric power lines, during a given portion of each revolution of the table 8, by way of arcuate segmental contacts 144 and 145 on the shaft 7 of the device, cooperating with wiper contacts 146 and 147 arranged and connecting with the terminals of the motors through conductors 148 and 149.

To reduce the load on the electric motor 136 to a minimum, the piston 26 of the fluid pressure motors 27 therebelow are arranged on the piston rods of the motors to be relatively rotatable with respect thereto, wherein there are two collars 152 arranged on the rods between which the pistons are held in position.

It has been stated that the entire jiggering operation may be performed by machine 4. If desired, however, an additional machine 5, similar in all respects to machine 4, may be included in the machinery group. The primary function of this machine would be to complete the work started by the first jigger, if there is not ample time for the first jigger so to do. This depends to a great extent on the nature of the ware being produced and the speed of travel of the conveyor. It will be obvious that the jiggering operation could be divided between several more machines rather than just the two illustrated, however, the idea to be conveyed is that ample jiggering time may be obtained, if necessary, by the use of more than one machine.

If desired, the jiggering machine 5 may be included as a permanent member of the machinery group and operated in a certain manner in conjunction with machine 4. Machine 4 may be adjusted to roughly finish the ware, leaving the work of polishing to machine 5. Also, relative rotation between the tool and work may be the reverse, on machine 5, of that on machine 4. In such event the beveled edge of the profiles of machine 5 would slope in the opposite direction to that of the profiles of machine 4. By reversing the relative rotation of the work and tool, the strains introduced by the first profile are removed and any surface fissures or cracks closed up. It will be understood that while I have shown the profile as stationary relative to the mold, the profile may be rotated with the mold remaining stationary.

Referring to Figs. 1 and 12, the dryer C more or less diagrammatically shown, includes a heating chamber 153 within which the major portion of the endless conveyor 15 is arranged to travel in an undulatory path upon series of upper and lower sets of sprocket wheels 155 and 156. The conveyor 15 extends from the drying chamber through an opening 157 in the front wall 158 thereof to be supported upon upper and lower sets of sprockets 159 and 160 to form a mold loading and unloading end B of the conveyor adjacent the station A whereby an attendant may conveniently transfer filled molds thereto from the conveyor 11—12 and transfer stripped or empty molds therefrom to said conveyor. The molds are carried on the conveyor 15 upon ventilated bottom trays 162 arranged between the chains thereof in equally spaced relation therealong and being in pivotal connection therewith, as at 163.

After being placed on the trays of the conveyor 15 at the station A, the molds with the ware therein are conveyed through the drying chamber to a stripping opening 164.

Although the conveyors 11—12 and conveyor 15 may be independently driven, they are, as shown, driven in synchronism by a common prime mover in the form of an electric motor 165. The driving wheel 13 of the conveyor 12 is secured on a vertical shaft 166 on which is a worm gear 167 meshing with a worm pinion 168 on the driving shaft 169 of a worm and gear type speed reducer 170 which is in driven connection with the motor 165 through an adjustable, conical pulley and belt type speed reducer 171 and a sprocket wheel and chain connection 172 cooperating between the shaft of the motor and the driven shaft of the belt type speed reducer. The conveyor 15 is driven by the motor 165 by way of the gear type speed reducer 170 on whose shaft 169 is a sprocket wheel 175 connected by chain 176 to a sprocket 176' on one of the upper shafts of the conveyor.

As diagrammatically illustrated in Fig. 13, the conveyor 11—12 may, if desired, extend through a drying chamber 177 thereby eliminating the manual mold transfer step. In this connection, the conveyor 12 is supported in the dryer on a track 178 between horizontal sprockets 179 which are rotatably mounted on posts 180. The conveyor travels in upwardly ascending and downwardly descending courses between longitudinally spaced sprockets, this arrangement saving considerable space and making possible the use of a dryer of minimum dimensions. Ware is stripped from the molds adjacent the elongated stripping opening 181 alongside the lower return course of the conveyor.

Thus, in the present organization, I have provided machinery including a turntable with which there are associated a number of feeders each to be brought successively into registry with molds disposed in spaced relation on the endless mold conveyor which, when driven, also rotates the turntable. The conveyor and turntable move continuously and during this movement the feeders are actuated to deliver charges of clay successively to the molds. After being charged with clay, a mold is carried by the conveyor to the next turntable which includes a multiple of preformers each adapted to successively register with molds disposed on the conveying means, whilst the conveying means and turntable are in motion as mentioned with regard to the feeder tables. The function of the preformer is to press and spread the plastic clay over the molding surface in order to form a blank of suitable thickness and diameter or height, depending on the flat or hollow character of the mold, for jiggering. The blank may be spread to the full diameter of the ware forming surface of the mold or to a degree less than the full diameter of the ware forming surface in which case the profile tool would complete the work of spreading incident to jiggering. After the blank has been formed, the mold, which has been continuously conveyed up to this point, moves on to the jigger and comes into registry with a profile tool. The jigger includes a turntable and several profiles each adapted to successively register with molds on the conveyor and by relative rotation of the tools and work the jiggering operation is performed and the piece completed, all whilst the conveyor, tools, turntable and molds are in continuous motion. As before stated, the operation may be divided between plural tables. After leaving the jigger or jiggers, the ware-bearing molds (the ware being completed insofar as plastic tooling is concerned) are transported through a dryer either on the machine conveyor or by means of an independent dryer conveyor to which they are transferred by hand. When the ware has dried, it is stripped from the molds and the molds all returned to the machines for refilling.

The conveyor 11—12 and molds may remain in association with the mold tables of the machines and the feeding and fabricating units any desired length of time with a maximum association of approximately 300 degrees of travel per machine in a four unit group. It is estimated this new arrangement will permit increases in production speed on the order of 700 per cent as compared with other systems. Furthermore, since the machinery operates continuously, there is not the wear and tear on the equipment which would result from intermittently stopping and starting as in other type apparatus.

While I have shown several machines grouped on a common base, it will be understood that each machine i. e. the feeder, preformer or either one or both jiggers could be operated individually with a mold conveyor. In other words, a unit comprising only the feeder and mold conveyor could be operated for the purpose of charging molds without the benefit of the preformer or jigger. The ware could be completed by hand jigger, if desired, or in any other suitable manner. Moreover, a unit comprising only the preformer and mold conveyor could be operated for the purpose of batting out or applying the clay to the molds. In such event, the molds could be charged by hand or by any other suitable means and jiggered by hand or machinery other than that disclosed. Furthermore, a unit comprising either one or both jiggers and the mold conveyor could be operated for the purpose of profiling pottery ware with the molds being charged by hand or by other suitable means. By the foregoing, I desire to point out that various sub-combinations of the whole are possible and all comprehended within the spirit and scope of this invention.

With regard to Figs. 1 and 4, the base of the machine is criss-crossed with T slots 180 in which are received the heads of inverted bolts 181 extending upwardly through holes in base clamps 182 and being secured thereto by nuts 183. The clamps have horizontal adjustment screws 184 for making minor adjustment in the location of the machines and vertical hold-down screws 185 for clamping the machine base to the floor. Any major adjustment in the location of any one or all machines can be quickly and easily accomplished by removing the clamps 182 and shifting the machine to the desired location.

While I have shown the preferred form of conveyor as comprising ring seats connected by cable sections, it will be understood that other forms of conveyor may be equally adaptable, such as, for instance, a chain conveyor or the like. It will also be understood that the machines may be driven by independent sprocket and chain in which event the mold conveyor would not be employed for the purpose of driving the machines as well as conveying the molds.

By virtue of the foregoing invention, it will be observed that I have provided a method or system wherein a mold is carried with sustained forward movement in one path and a fabricating implement is carried with sustained forward movement in another, and different, orbital path and in a portion of their respective paths the mold and implement are brought into registration and fabricating cooperation. The molds in this case are transported in a tortuous path and in the curved portions of the path are located the fabricating machines on adjustable bases. The length of the curved portions of the path, or rather the amount of conveyor in association with the table of a particular machine determines the time available for the performance of an operation on the mold by the fabricating implements of the machine. Obviously, variations in the time of the fabrication can be obtained by varying the position of the machines relative to the conveyor. The instant of initiation of the fabricating operation, the duration and endpoint of such operation is of course controlled by and variable by means of the valves in the fluid system.

In this invention, the feeding of clay to molds may be considered as a fabricating step.

I claim:

1. In combination, a feeding means, preforming means and profiling means, carriers therefor and means for moving said carriers and means in orbital paths with uninterrupted forward movement, a pottery mold, a carrier therefor, means for moving said mold carrier and mold in another path with uninterrupted forward movement to bring the mold successively into registration with the feeding means and preforming means and profiling means, means for causing said feeding, preforming and jiggering means to perform their designated functions whilst in registration with the mold.

2. In combination, an endless flexible conveyor having at least a portion thereof arranged in a tortuous path, a plurality of rotatable tables, the perimeters of which define the tortuous path aforesaid, a multiple of fabricating instrumentalities associated with each table, molds disposed on said conveyor and means for continuously driving said conveyor and tables to impart sustained forward movement to the instrumentalities and molds in their respective orbits and bring the instrumentalities successively into registration with successive molds and means for moving said molds and instrumentalities relative to one another when in register.

3. In combination, an endless flexible mold conveyor having at least a portion thereof arranged in a tortuous path, molds disposed thereon, a plurality of pottery fabricating machines adjustably positioned along the tortuous path portion, fabricating implements associated with said machines, means for continuously driving said conveyor and fabricating machines to thereby continuously move the implements and molds in orbital paths and bring the implements and molds successively into registration and means for effecting co-operation between the implement and molds when in registration.

4. In combination, apparatus for continuously advancing a line of pottery molds in a tortuous horizontal path wherein clay is formed on the molds into articles of potteryware, fabricating implements arranged adjacent curved portions of said path, means for continuously rotating said fabricating implements about a given axis into and out of registry and cooperation with the molds, means for varying the tortuosity of the path and means for varying the time of operation of the implements.

5. In combination, apparatus for continuously advancing a line of pottery molds along a tortuous path wherein clay is formed on the molding surface of the molds, means for fabricating potteryware disposed adjacent the tortuous path portion of the apparatus and adapted to cooperate with the molds and means for continuously rotating said fabricating means in a circle about a given axis into and out of register with successive molds.

6. In combination, apparatus for continuously advancing a single line of pottery molds along a tortuous path wherein clay is formed and dried on the molds, feeding and fabricating means located adjacent one portion of the tortuous path for cooperation with the molds and a dryer housing another portion of the tortuous path and means for continuously rotating said feeding and fabricating means about separate axes to move the same into and out of register with successive molds.

7. In apparatus for manufacturing pottery ware, a plurality of rotary tables, devices associated with said tables operable in the production of pottery ware, endless mold conveying means associated with said tables, a dryer in which said conveying means travels at least in part in predominately horizontal vertically ascending and descending courses, means for driving said conveying means and tables to bring successive devices into registry with said molds and also transport molds through the dryer, and means for effecting the functioning of the devices in their respective pottery producing operations when in registration with the molds.

8. In apparatus for manufacturing pottery ware, a plurality of rotary tables, a plurality of devices operative in the production of pottery ware associated with said tables, mold lifters associated with at least some of said tables, conveying means for molds associated with said tables, molds disposed thereon, means for driving said conveying means and tables to bring successive devices and lifters into registration with said molds, means for effecting the raising of the lifters and the operation of the devices when the molds are in registry therewith and whilst the conveying means and tables are in continuous motion and a dryer through which molds bearing completed ware are transported.

9. In apparatus for manufacturing pottery ware, a rotary table having a plurality of feeders associated therewith, a rotary table having a plurality of preformers associated therewith and one or more rotary tables having a plurality of profiles associated therewith, a conveyor associated with said tables and arranged so that the amount of conveyor associated with the profile table or tables is greater than the amount associated with the other tables mentioned, and means for driving said tables and said conveyor to bring said feeders, preformers and profiles successively into cooperation with said molds.

10. In combination with a plurality of pottery forming molds, a plurality of pottery forming tools mounted for rotation about a common axis and a continuously driven, endless, flexible conveyor for supporting the molds having a horizontal portion travelling in a path concentric with the axis for rotating the tools thereabout and causing them to move into register with said molds and to function and fabricate ware on the molds carried by the conveyor whilst travelling therewith.

11. In combination with a plurality of pottery ware forming molds, a plurality of clay feeders mounted for rotation about an axis, a plurality of pottery forming tools rotatable about an axis, a continuously driven, endless flexible conveyor for supporting the molds that travels in a horizontal path having portions concentric with each axis and is operable to rotate the feeders and tools about their respective axes and cause them to feed clay onto the molding surface of the molds carried thereby and fabricate the clay into ware respectively.

12. In combination, pottery ware fabricating apparatus having a rotatable turntable, an endless flexible mold conveyor arranged with a portion looped about said turntable, driving means for moving the turntable and conveyor to bring the fabricating apparatus into register with successive molds, and means operable to relatively move said fabricating apparatus and molds when in register to effect a fabricating operation.

13. In combination, clay feeding apparatus having a turntable, potteryware fabricating apparatus having a turntable, an endless flexible mold conveyor looped about both turntables and means for driving the conveyor and both turntables in unison.

14. In combination, a plurality of clay feeders rotatable about an axis, a plurality of clay fabricating implements rotatable about another axis, an endless flexible mold conveyor arranged with a portion concentric with one axis and another portion concentric with the other axis and means for moving said conveyor and rotating said feeders and fabricating implements about their respective axes.

15. In combination, a dryer, a pottery fabricating machine having a turntable associated therewith, a mold conveyor arranged to travel in said dryer and having a portion looped about said turntable, pottery molds carried by said conveyor, and means for continuously moving said conveyor so as to transport molds in continuous fashion in an endless path through the dryer and fabricating machine.

16. In combination, potteryware fabricating apparatus having a turntable associated therewith, an endless, flexible mold conveyor looped about said turntable in driving association therewith, means for driving said conveyor to turn said turntable to bring the fabricating apparatus and successive molds into register, and means operable to move said fabricating apparatus relative to said molds when in regitser to effect a fabricating operation.

17. In combination, clay feeding apparatus, having a turntable associated therewith, clay fabricating apparatus having a turntable associated therewith, an endless flexible mold conveyor looped about said turntables in driving association therewith and drive means for actuating said conveyor.

18. In apparatus for producing potteryware, a plurality of rotatable tables having peripheral formations for receiving mold carriers, an endless horizontally disposed flexible mold conveyor looped about said tables, mold carriers associated with said conveyor arranged to interfit with the peripheral formations of the tables to thereby establish a driving association and means for moving said conveyor.

19. In combination, a plurality of turntables, potteryware forming means associated with each table and revolvable therewith, an endless flexible mold conveyor looped about said tables and means for varying the amount of conveyor in association with said turntables.

20. The combination with continuously driven apparatus for advancing a line of pottery molds along a path wherein clay is fed thereto and formed thereon into articles of potteryware of clay feeding and ware-forming means thereabove mounted for movement in a circular path about given axes into and out of register with successive molds, means for continuously rotating said clay feeding and ware forming means about the respective axes and means operable incident to rotation thereof for relatively moving the ware forming means and molds into cooperation when in register to effect a ware forming operation.

21. The combination with a continuously moving, endless, flexible mold conveyor of a revolving feeder having feed outlets thereabove through which clay is fed to successive molds, a revolving preformer for preforming clay in said molds, a revolving jigger for forming ware on said molds and means for continuously rotating said feeder, preformer and jigger and moving said conveyor to index successive molds with the feeder, preformer and jigger, and means for causing said feeder, preformer and jigger to perform feeding, preforming and jiggering operations when in register with said molds.

22. The combination with a continuously driven, endless, flexible mold conveyor of a plurality of clay feeders thereabove, means for continuously rotating said clay feeders about a given axis to bring successive clay feeders into register with successive molds, means for causing clay to be fed to said molds from the clay feeders when in register therewith, and traveling clay preforming and jiggering means arranged for movement with said molds to preform and jigger clay thereon.

23. Apparatus for manufacturing dinnerware and the like comprising a continuously movable support for carrying molds in fabricating zones, means movable therewith for forming ware on said molds in said zone, and a continuously traveling mold conveyor movable with the support through the fabricating zone for delivering empty molds thereto and removing filled molds therefrom.

24. The combination with a traveling, endless, flexible mold conveyor having mold supports attached thereto for transporting molds through a fabricating zone, of a clay feeder thereabove rotatable about an axis into and out of register with successive molds, a support for carrying said mold supports through the fabricating zone, and traveling jiggering means arranged for movement with said mold supports.

25. The combination with a traveling, endless, flexible mold conveyor having mold suports attached thereto for transporting molds through a fabricating zone, of a clay feeder thereabove rotatable about an axis into and out of register with successive molds, a support for carrying said mold supports through the fabricating zone, and traveling preforming means arranged for movement with said mold supports.

26. The combination with a traveling, endless, flexible mold conveyor having mold supports attached thereto for transporting molds through fabricating zones of a preformer at one of said zones continuously rotatable about an axis into and out of register with successive mold supports and a jigger tool at another of said zones continuously rotatable about an axis into and out of register with said mold supports, and supports for carrying the mold supports through the fabricating zones.

27. Apparatus for manufacturing dinnerware and the like comprising, an endless flexible mold conveyor having mold supports for transporting molds through feeding and fabricating zones, means for supplying clay to said molds at the feeding zone, and a traveling fabricating means at the fabricating zone continuously rotatable about an axis into and out of register with successive mold supports.

28. Apparatus for manufacturing dinnerware and the like comprising, a support for carrying mold carriers through a fabricating zone including a stationary track and an angularly movable mold seat carrier, means for fabricating ware on molds in said zone and a mold conveyor formed for meshing mold carriers with said carrier.

29. Apparatus for manufacturing dinnerware and the like comprising a support formed for carrying mold seats in a fabricating zone, continuously traveling ware fabricating means in said zone and a continuously moving conveyor formed with seats engageable with the support for transporting molds in the fabricating zone, and for carrying molds to and from the support.

30. Apparatus for manufacturing dinnerware and the like comprising a support for carrying mold seats in a fabricating zone including a stationary track and a movable carrier formed for transporting mold seats, continuously traveling fabricating means in said zone and a continuously moving conveyor formed with mold seats engageable with the carrier for transporting molds in the fabricating zone, and for carrying molds to and from the carrier.

31. Apparatus for manufacturing dinnerware and the like comprising a rotatable support formed for carrying mold seats in a fabricating zone, continuously traveling fabricating means in said zone and a continuously moving conveyor formed with mold seats engageable with the support for transporting molds in the fabricating zone, and for carrying molds to and from the support.

32. Apparatus for manufacturing dinnerware and the like comprising a support including movable and stationary mold seat carrying members, continuously traveling fabricating means in said zone and a continuously moving conveyor formed with mold seats engageable with the movable member and undersupported by the stationary member for transporting molds in the fabricating zone.

33. Apparatus for manufacturing dinnerware and the like comprising a continuously moving support for carrying molds through a fabricating zone, means for forming ware on said molds in said zone, and a mold conveyor formed for transporting empty molds to said support and removing filled molds therefrom and carrying them away.

34. Apparatus for manufacturing dinnerware and the like comprising a continuously moving rotatable support for carrying molds through a fabricating zone, means for forming ware on said molds in said zone, and a mold conveyor formed for transporting empty molds to said support and removing filled molds therefrom and carrying them away.

35. The combination of a table provided with circumferentially spaced recesses therethrough, means for rotating said table to carry the recesses through a fabricating zone, a plurality of members for supporting articles, and an endless, traveling conveyor for carrying said members in a plane normal to the axis of the table into and out of seated relation with said recesses whereby articles are deposited on said table and removed therefrom.

WILLIAM J. MILLER.